July 22, 1969 C. GLANDIN 3,457,140
SPACER FOR FUEL ASSEMBLIES IN A NUCLEAR REACTOR
Filed Dec. 26, 1967

INVENTOR.
CONSTAN GLANDIN
BY
Jennings Bailey Jr

United States Patent Office 3,457,140
Patented July 22, 1969

3,457,140
SPACER FOR FUEL ASSEMBLIES IN A NUCLEAR REACTOR
Constan Glandin, Vasteras, Sweden, assignor to Allmänna Svenska Elektriska Aktiebolaget, Vasteras, Sweden, a corporation of Sweden
Filed Dec. 26, 1967, Ser. No. 693,412
Claims priority, application Sweden, Dec. 30, 1966, 17,927
Int. Cl. G21c 3/34
U.S. Cl. 176—78                14 Claims

ABSTRACT OF THE DISCLOSURE

A spacer for a nuclear fuel assembly which spacer comprises an outer frame surrounding two rigid grids in spaced relationship to each other and bent, strip-like and resilient spacer springs supported by and extending between the two grids. Each grid comprises a plurality of polygonal meshes and each spring has opposite ends fixed to the grids at the corners of the meshes and a varying strip width to provide an optimal spacer from the flow point of view.

BACKGROUND OF THE INVENTION

Field of the invention

The present invention relates to spacers for the fuel assemblies of a nuclear reactor, comprising a spacer body and spacer springs supported by this body to form fuel rod positioners.

In a nuclear reactor a coolant flows through the fuel assemblies along the fuel rods. The spacers used to determine the distance between the separate fuel rods form flow obstructing elements which retard the flow of coolant. It has been found to be of great importance that the flow resistance properties of the spacers are reduced as much as possible.

The prior art

In order to ensure that the fuel rods are held fast in a fuel assembly it has previously been suggested to design the spacers so that they consist of a rigid spacer body and elongated resilient spacer springs, said body having an outer frame and two essentially parallel grids attached to said frame in spaced relationship to each other, each of said grids comprising a plurality of polygonal meshes and each of said elongated spacer springs being supported by and extending between said two grids and having opposite ends fixed to said two grids at the corners of said meshes.

Spacers so designed provide exact and reliable positioning of the separate fuel rods and also offer considerable advantages from the mounting point of view.

SUMMARY OF THE INVENTION

The present invention relates to a further development of this already proposed type of spacer. The purpose of the invention is to effect a spacer of the above-mentioned type which offers the least possible flow resistance while taking into consideration the strength which is demanded of such a spacer. In other words, the invention relates to an optimal dimensioning of the spacer from the flow point of view.

The invention is characterised in that the springs of the spacer, which extend substantially parallel to the fuel rods, consist of bent spring strips with varying width in order to provide decreased flow resistance. The width of the strip is adjusted to the angle of the strip in relation to the flow of the coolant and also to the load arising on the strip within the area in question. In principle it may be said that the parts of the strip which are parallel to the flow direction may be wide, whereas those parts which form an angle to the direction of flow should be as narrow as possible. However, the stress concentration arising due to the bending of the strip and width variations must be observed so that the construction is sufficiently strong.

According to a preferred embodiment of the invention the spring strips are given protuberances directed towards the fuel rods and having a narrower part between the top and bottom of the protuberance. The top itself must be somewhat wider in order to present a good abutment surface for the fuel rods. From the point of view of strength it has been found favorable to make the spring strips wide on the part running parallel to the fuel rods immediately ahead of said protuberance. For the same reason greater strip width is required at the end points of the spring strips and the most economical design is therefore obtained if the spring strips are made wide at the end points and immediately before the protuberance, but considerably narrower between these parts. The transition between the wide parts and the narrow part is suitably wedge shaped.

Extensive calculations have shown that the part of the spring strip protuberance intended to abut the fuel rod should be about half the width of the widest part of the spring strip.

In the same way as the spring strips, those parts of the spacer from which the spring strips extend are shaped so that the parts at the starting ponts of the strips are wider than the parts between the starting points.

This arrangement of the spacer means that the spacer is very light, but in spite of this, is stable and reliable. The spacer springs are suitably designed so that the grids remain substantially unaffected by stresses in a direction at right angles to the grids. The two grids thus receive a certain support from the spacer springs, at the same time providing attachment points for these. For a spacer body of the above mentioned type the spacer springs are most suitably shaped so that they are constituted by strip-shaped spring members running substantially at right angles to the grid planes and being provided at the centre part with convex parts or abutting bodies facing the fuel rod positions of the grids and projecting substantially parallel to the grids. The grids may be composed of closed profiles joined together, for example, by means of welding or soldering if so desired, but the grids can also be produced by placing laths crossing each other over the outer frame of the spacer body.

The invention is especially suitable for manufacturing grids and spacer springs in one piece by punching them from a flat metal sheet. The abutting convex parts of the spacer springs are obtained by bending the punched flat metal sheet, preferably in a rounded angle at the centre and afterwards bending it in the opposite direction on both sides of the first mentioned bend. Finally the metal sheet is bent at right angles to the first bends to form a closed profile and these closed profiles are finally joined so that in this way the two grids are formed.

BRIEF DESCRIPTION OF THE DRAWINGS

In the following the invention will be more fully described with reference to the accompanying drawings.

DESCRIPTION OF THE PREFERRED EMBODIMENTS

Figure 1:
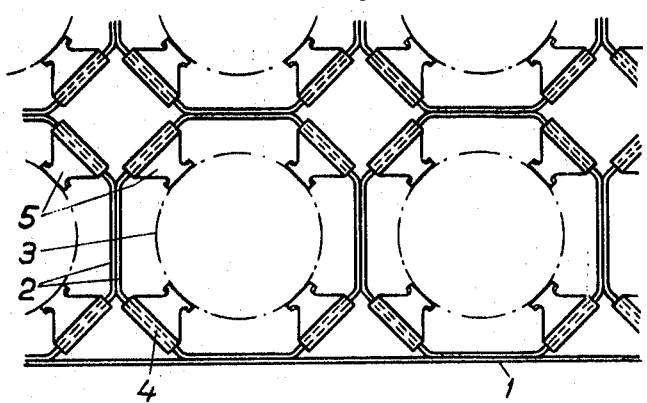
FIGURE 1 shows an axial projection of one part of a spacer according to the invention.

In the figures, 1 designates the outer frame of the spacer and 2 the inner intermediate walls which form the fuel rod positioners in the spacer. In the spacer according to FIGURE 1 the intermediate walls 2 are formed by a number of separate closed profiles having basically square form, each of which will enclose a fuel rod 3 indicated in the figure. The closed profiles are rigidly connected to each other, preferably welded together, and the square basic form is modified at the corners with a bevel 4 to provide an attachment or starting point for the spacer springs 5. The intermediate walls 2 form a grid and the spacer according to the invention comprises two such grids placed at a distance from each other in the axial direction of the fuel rods and both attached to the common outer frame 1. Each fuel rod positioner thus comprises two closed profiles one below the other and four spacer springs 5 of varying strip width placed between them. The spacer springs in the shown embodiment comprise separate elements which are bent over the corner bevels of the fuel rod positioners and possibly secured with the help of welding or soldering.

To reduce the weight of the spacer the sides of the essentially square closed profile are ground so that the wall thickness in the sides is less than in the corner bevels 4. The corners require greater thickness since they support the spacer springs 5.

Figure 2:
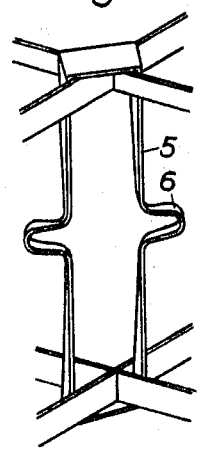
FIGURE 2 shows a perspective sketch of a slightly different embodiment of the invention.

In FIGURE 2 is shown an embodiment where the intermediate walls 2 consist of laths crossing each other and supported by the outer frame 1, not shown in FIGURE 2. The laths are provided with slots so that they can cross each other in the same plane at the point of intersection. In the embodiment according to FIGURE 2 the spacer springs 5 comprise strip-shaped spring members of varying strip width placed diagonally across the intersection points of the intermediate walls 2. The spring strips 5 may with advantage be combined to form closed units when mounting. About in the middle between the upper and the lower grids the spacer springs are provided with convex parts 6 which provide abutting bodies for the fuel rods. The convex parts 6 may possibly be replaced by rigid abutting bodies. The springs 5 are dimensioned suitably so that normally no forces acting at right angles to the grid occur. In the figures only one diagonally placed spring strip is shown. In a complete spacer a second spring strip is also arranged at right angles to that shown.

Figure 3:
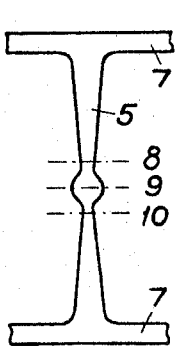
FIGURES 3 and 4 show a portion of a flat piece of metal sheet material for manufacturing a spacer according to the invention.
Figure 4:
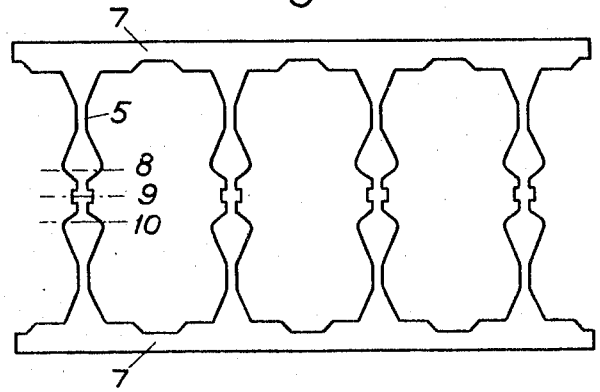
Figure 5:
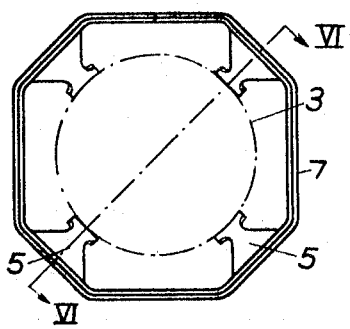
FIGURE 5 show an axial view of the position of a fuel rod in a spacer according to FIGURE 4.

In the FIGURES 3–6, 7 designates the grid parts of the spacer, that is those parts which form an upper and a lower grid to which the spring parts of the spacer are attached. The spring part of the spacer is designated 5 and consists of a strip punched out of the same metal sheet as the grid parts 7. FIGURE 4 shows a punched metal sheet for a whole fuel rod positioner, whereas FIGURE 3 shows only a part of such a piece. Such a punched metal sheet is bent so that the spring parts 5 midway between their ends have transverse protuberances and the metal sheet is then bent so that the grid parts 7 form an upper and a lower square with bevelled corners. The whole spacer is then built up of such squares, each intended to take up one fuel rod as shown in FIGURE 5.

FIGURE 3 shows the most simple embodiment of a spring strip with varying strip width. The protuberances of the spring strips are bent approximately at the lines 8, 9 and 10 so that the section around the line 9 forms the top of the protuberance, that is, the part which will abut the fuel rod. FIGURE 4 shows the arrangement of corresponding parts when the idea of the invention is developed as far as possible, taking into consideration the flow resistance, strength and quantity of material used in the spacer. The relatively complicated shape of the spacer parts does not involve any great extra costs when large numbers are manufactured. Thus the FIGURES 4–6 show the most preferred embodiment of the invention.

FIGURE 5 shows a fuel rod positioner seen in axial direction of the fuel rod. The contour of the fuel rod is designated 3. The spring strips 5 are situated in the corner parts of the fuel rod positioner. The grid parts 7 are indicated by double contours since, as is clear from FIGURE 6, they are bevelled.

Figure 6:
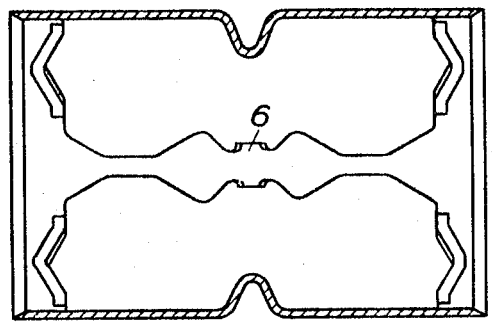
FIGURE 6 shows the cross section VI—VI in FIGURE 5.

FIGURE 6 is intended to illustrate how the bent central part of the spring strip is positioned in relation to the strip parts of different width. From the figure it is clear that the strip is widest immediately before the bend and has a somewhat wider abutment head 6 at the top of the bend.

The invention is not limited to the shown embodiments, but several variations and modifications are possible within the scope of the following claims.

I claim:

1. A nuclear fuel assembly including a plurality of elongated fuel elements supported in a bundle, spacing means for spacing the fuel elements from each other, said spacing means comprising a rigid spacer body and elongated resilient spacer springs, said body having an outer frame and two essentially parallel grids attached to said frame in spaced relationship to each other, each of said grids comprising a plurality of polygonal meshes and each of said elongated spacer springs being supported by and extending between said two grids and having opposite ends fixed to said two grids at the corners of said meshes, wherein the improvement comprises that said spacer spring comprise bent spring strips having varying strip width to provide decreased flow resistance.

2. A nuclear fuel assembly according to claim 1, wherein the spring strips have protuberances facing the fuel rods, each protuberance having a narrower section between the top and the bottom of the protuberance.

3. A nuclear fuel assembly according to claim 1, wherein the spring strips have protuberances facing the fuel rods, the spring strips being widest in the part running parallel to the fuel rods immediately adjacent the protuberance directed towards the fuel rods.

4. A nuclear fuel assembly according to claim 3, wherein at their starting points from the two spacer grids the spring strips are approximately the same width as immediately adjacent the protuberance and substantially wedge-shaped, narrowing from the wide parts just mentioned to a narrow section approximately equidistant from said wide parts.

5. A nuclear fuel assembly according to claim 3, wherein the part of the spring strip protuberance which is intended to abut the fuel rod is approximately half as wide as the widest part of the spring strip.

6. A nuclear fuel assembly according to claim 1, wherein the parts of the grids from which spring strips extend are wide in the direction of the spring strip at its starting points and narrower between said points.

7. A nuclear fuel assembly as claimed in claim 1, wherein said spacer springs comprise strip-shaped spring members running substantially at right angles to said grids and have between said grids convex parts facing said fuel rods and projecting substantially parallel to said grids.

8. A nuclear fuel assembly as claimed in claim 1, wherein said grids comprise a plurality of polygonal ring-formed members rigidly attached to each other.

9. A nuclear fuel assembly as claimed in claim 8, wherein each of said polygonal ring-formed members from each of said two grids, together with the respective spacer springs, form a fuel rod location.

10. A nuclear fuel assembly as claimed in claim 9, wherein the two polygonal ring-formed members belonging to a certain fuel rod location and the spacer springs belonging to the same fuel rod location are made in one piece.

11. A nuclear fuel assembly as claimed in claim 8, wherein said polygonal ring-formed members have substantially square form with bevelled corners forming attachment points for said spacer springs.

12. A nuclear fuel assembly as claimed in claim 11, wherein said substantially square ring-formed members have greater wall thickness at said bevelled corners than between said corners.

13. A nuclear fuel assembly as claimed in claim 1, wherein said grids comprise groups of essentially parallel lath-shaped elements crossing each other.

14. A nuclear fuel assembly as claimed in claim 13, wherein said spacer springs form closed loops of strip material, said loops running diagonally across the intersection points of said lath-shaped elements forming the grid.

References Cited

UNITED STATES PATENTS

| | | | |
|---|---|---|---|
| 3,228,854 | 1/1966 | Bekkering et al. | 176—78 |
| 3,255,090 | 6/1966 | Leirvik | 176—78 |
| 3,255,091 | 6/1966 | Frisch | 176—76 X |
| 3,298,922 | 1/1967 | Prince et al. | 176—78 |
| 3,301,764 | 1/1967 | Timbs et al. | 176—78 |
| 3,301,765 | 1/1967 | Eyre et al. | 176—78 |
| 3,350,275 | 10/1967 | Venier et al. | 176—76 X |

BENJAMIN R. PADGETT, Primary Examiner

M. J. SCOLNICK, Assistant Examiner

U.S. Cl. X.R.

176—76